(12) United States Patent
Higuchi

(10) Patent No.: US 9,420,471 B2
(45) Date of Patent: Aug. 16, 2016

(54) BASE STATION, MOBILE STATION, RADIO COMMUNICATION SYSTEM, AND COMMUNICATION CONTROL METHOD

(75) Inventor: Kenichi Higuchi, Saitama (JP)

(73) Assignee: NTT DOCOMO, Inc., Tokyo (JP)

( * ) Notice: Subject to any disclaimer, the term of this patent is extended or adjusted under 35 U.S.C. 154(b) by 180 days.

(21) Appl. No.: 13/530,992

(22) Filed: Jun. 22, 2012

(65) Prior Publication Data

US 2012/0263136 A1 Oct. 18, 2012

Related U.S. Application Data

(63) Continuation of application No. 12/531,521, filed as application No. PCT/JP2008/054744 on Mar. 14, 2008.

(30) Foreign Application Priority Data

Mar. 20, 2007 (JP) ................................. 2007-073728

(51) Int. Cl.
| | |
|---|---|
| *H04W 16/10* | (2009.01) |
| *H04J 11/00* | (2006.01) |
| *H04J 13/00* | (2011.01) |
| *H04J 13/16* | (2011.01) |
| *H04L 5/00* | (2006.01) |

(Continued)

(52) U.S. Cl.
CPC ........... *H04W 16/10* (2013.01); *H04J 13/0074* (2013.01); *H04J 13/16* (2013.01); *H04L 5/0007* (2013.01); *H04L 5/0051* (2013.01); *H04J 11/005* (2013.01); *H04W 16/02* (2013.01); *H04W 28/16* (2013.01); *H04W 72/04* (2013.01); *H04W 72/042* (2013.01); *H04W 88/08* (2013.01)

(58) Field of Classification Search
CPC ..... H04J 11/005; H04J 13/0074; H04J 13/16; H04L 5/0007; H04L 5/0051; H04W 16/02; H04W 16/10; H04W 28/16; H04W 72/04; H04W 72/042; H04W 88/08
See application file for complete search history.

(56) References Cited

U.S. PATENT DOCUMENTS 6,226,337 B1 * 5/2001 Klank et al. .................. 375/367
6,647,000 B1 11/2003 Persson et al.
(Continued)

OTHER PUBLICATIONS

TSG-RAN WG1 #46bis, R1-062856, Title: Uplink reference signals; Source: Ericsson, Seoul, Korea, Oct. 9-13, 2006, 6 pages.*
Source: Texas Instruments, Title: Sequence Hopping for the Uplink Reference Signal, Jan. 15-19, 2007, 3GPP TSG RAN WG1 #47bis, R1-070268, 8 pages.*

(Continued)

*Primary Examiner* — Marsha D Banks Harold
*Assistant Examiner* — Hooman Houshmand
(74) *Attorney, Agent, or Firm* — Osha Liang LLP

(57) ABSTRACT

One of sequence groups each specifying reference signal sequences for respective radio resource bandwidths is assigned to a base station and a different one of the sequence groups is assigned to a neighboring cell. The base station includes a scheduler configured to allocate radio resources; a reporting unit configured to report the allocated radio resources and a cyclic shift amount to a mobile station; and a demodulating unit configured to demodulate a signal received from the mobile station based on one of the reference signal sequences corresponding to one of the radio resource bandwidths and the cyclic shift amount. Cell reuse is applied to the reference signal sequences to be transmitted using one resource unit, and sequence hopping where different ones of the reference signal sequences are assigned to consecutive subframes is applied to the reference signal sequences to be transmitted using a bandwidth greater than one resource unit.

13 Claims, 11 Drawing Sheets

(51) Int. Cl.
*H04W 16/02* (2009.01)
*H04W 28/16* (2009.01)
*H04W 72/04* (2009.01)
*H04W 88/08* (2009.01)

(56) References Cited

U.S. PATENT DOCUMENTS

| | | | | |
|---|---|---|---|---|
| 7,965,797 | B2 | 6/2011 | Kwasinski et al. | |
| 7,995,664 | B2* | 8/2011 | Ihm et al. | 375/260 |
| 8,068,551 | B2* | 11/2011 | Kowalski | 375/267 |
| 8,094,638 | B2* | 1/2012 | Muharemovic et al. | 370/342 |
| 8,169,992 | B2* | 5/2012 | Parkvall et al. | 370/342 |
| 8,170,126 | B2* | 5/2012 | Muharemovic et al. | 375/260 |
| 8,422,532 | B2* | 4/2013 | Nakao et al. | 375/130 |
| 2007/0171995 | A1* | 7/2007 | Muharemovic et al. | 375/260 |
| 2007/0183386 | A1 | 8/2007 | Muharemovic et al. | |
| 2007/0201408 | A1* | 8/2007 | Tiirola et al. | 370/335 |
| 2008/0056117 | A1* | 3/2008 | Muharemovic et al. | 370/203 |
| 2008/0075195 | A1 | 3/2008 | Pajukoski et al. | |
| 2008/0080560 | A1 | 4/2008 | Inoue et al. | |
| 2008/0181194 | A1* | 7/2008 | Lindoff et al. | 370/350 |
| 2008/0225788 | A1 | 9/2008 | Inoue et al. | |
| 2008/0232235 | A1* | 9/2008 | Kowalski et al. | 370/203 |
| 2009/0252260 | A1* | 10/2009 | Noh et al. | 375/343 |
| 2009/0303961 | A1* | 12/2009 | Popovic et al. | 370/330 |
| 2010/0111142 | A1* | 5/2010 | Iwai et al. | 375/146 |
| 2010/0195700 | A1* | 8/2010 | Ogawa et al. | 375/132 |
| 2011/0244850 | A1* | 10/2011 | Lindoff et al. | 455/422.1 |

OTHER PUBLICATIONS

Source: Toshiba Corporation, Title: UL Reference Signal Transmission for E-UTRA, Feb. 12-16, 2007, 3GPP TSG RAN WG1 #48, R1-071051, St Louis, USA, (4 pages).*

International Search Report w/translation from PCT/JP2008/054744 dated Jun. 3, 2008 (4 pages).

Written Opinion from PCT/JP2008/054744 dated Jun. 3, 2008 (3 pages).

3GPP TSG RAN WG1 LTE Ad Hoc, R1-061678; "Pilot Sequence Allocation Method in E-UTRA Uplink"; Cannes, France; Jun. 27-30, 2006 (6 pages).

TSG-RAN WG1 #46bis, R1-062856; "Uplink Reference Signals"; Ericsoon, Seoul, Korea; Oct. 9-13, 2006 (6 pages).

3GPP TSG-RAN WG1 #47, R1-063474; "On Reference Signals for SC-FDMA"; Lucent Technologies; Riga, Lativa; Nov. 6-10, 2006 (7 pages).

3GPP TSG RAN WG1 #47bis, R1-070268; "Sequence Hopping for the Uplink Reference Signal"; Texas Instruments; Sorrento, Italy; Jan. 15-19, 2007 (8 pages).

3GPP TSG RAN WG1 #48, R1-070726; "Sequence Hopping for the Uplink Reference Signal"; Texas Instruments; St Louis, US; Feb. 12-16, 2007 (8 pages).

3GPP TSG RAN WG1 #48; R1-071051; "UL Reference Signal Transmission for E-UTRA"; Toshiba Corporation; St. Louis, USA; Feb. 12-16, 2007 (4 pages).

3GPP TR 25.814, V7.0.0; "Physical layer aspects for evolved Universal Terrestrial Radio Access (UTRA)"; Jun. 2006 (126 pages).

* cited by examiner

FIG.6

| RS SEQUENCE GROUP NUMBER | 1 RU: SEQUENCE HOPPING IS NOT APPLIED | 2 RUs: SEQUENCE HOPPING IS APPLIED | 3 RUs: SEQUENCE HOPPING IS APPLIED |
|---|---|---|---|
| 1 | RS SEQUENCE [1RU, 1] | SEQUENCE HOPPING USING RS SEQUENCE [2RU, 1] AND RS SEQUENCE [2RU, 13] | SEQUENCE HOPPING USING RS SEQUENCE [3RU, 1], RS SEQUENCE [3RU, 13], AND RS SEQUENCE [3RU, 37] |
| 2 | RS SEQUENCE [1RU, 2] | SEQUENCE HOPPING USING RS SEQUENCE [2RU, 2] AND RS SEQUENCE [2RU, 14] | SEQUENCE HOPPING USING RS SEQUENCE [3RU, 2], RS SEQUENCE [3RU, 14], AND RS SEQUENCE [3RU, 38] |
| ... | | | |
| 12 | RS SEQUENCE [1RU, 12] | SEQUENCE HOPPING USING RS SEQUENCE [2RU, 12] AND RS SEQUENCE [2RU, 24] | SEQUENCE HOPPING USING RS SEQUENCE [3RU, 12], RS SEQUENCE [3RU, 24], AND RS SEQUENCE [3RU, 48] |

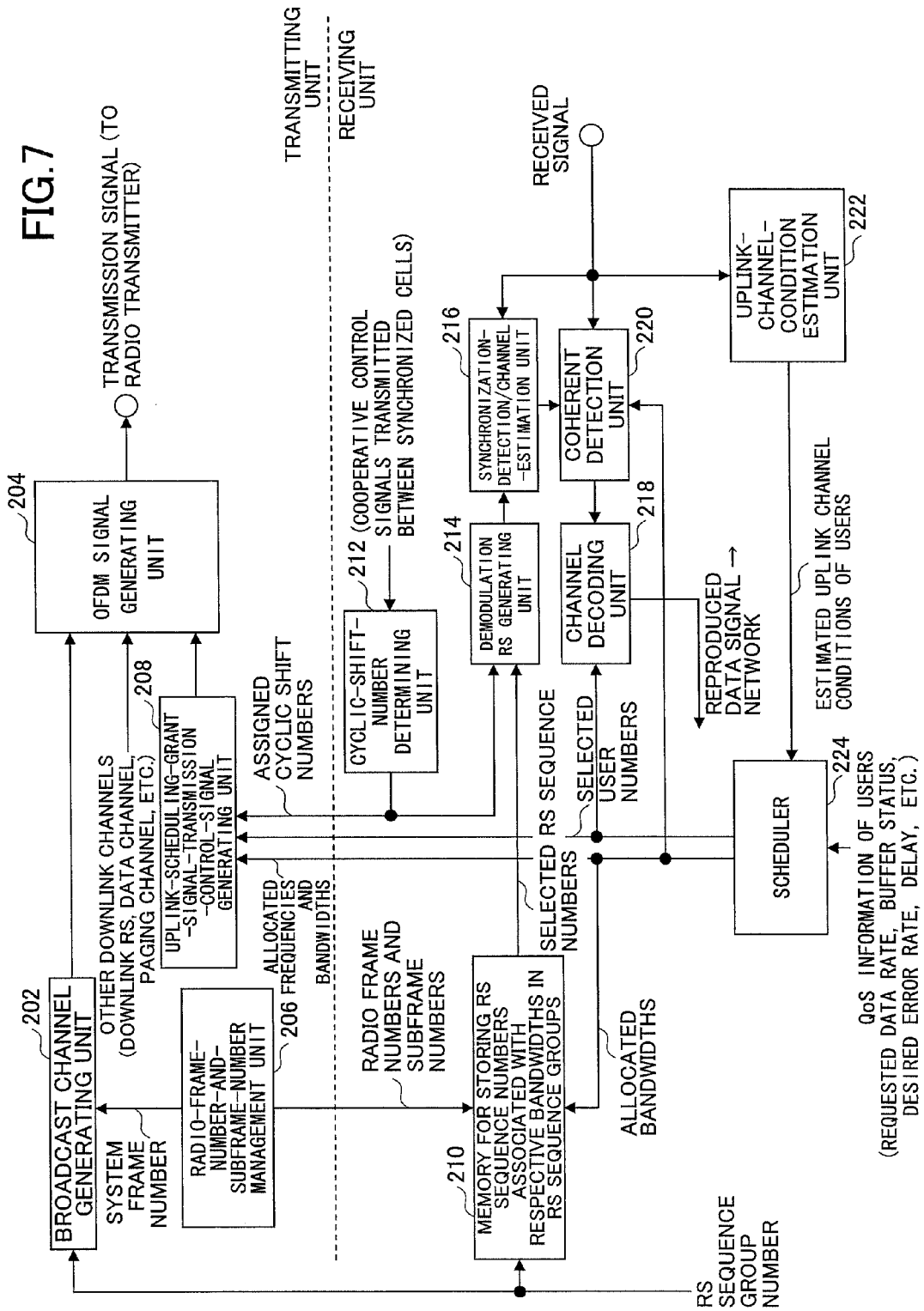

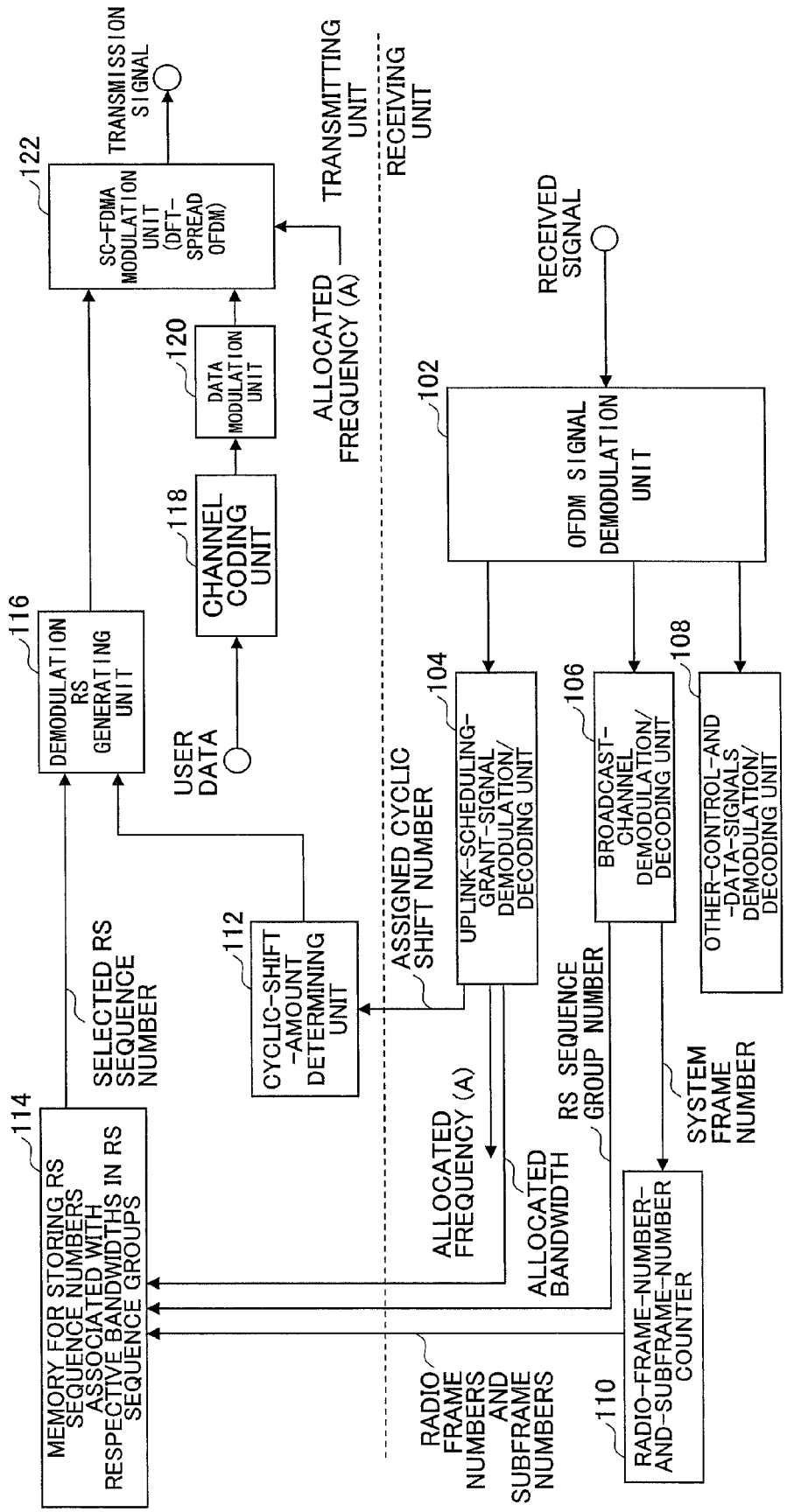

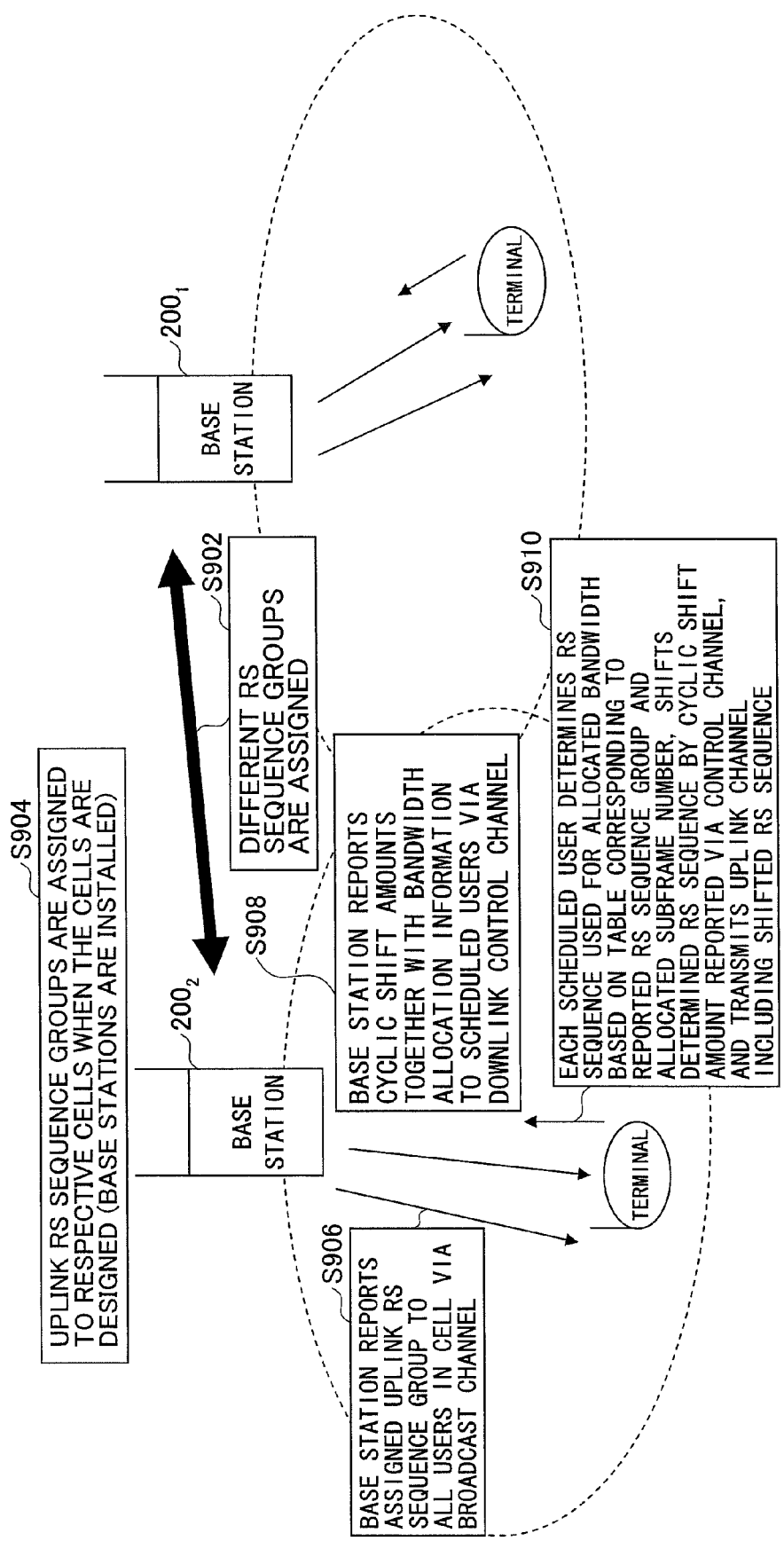

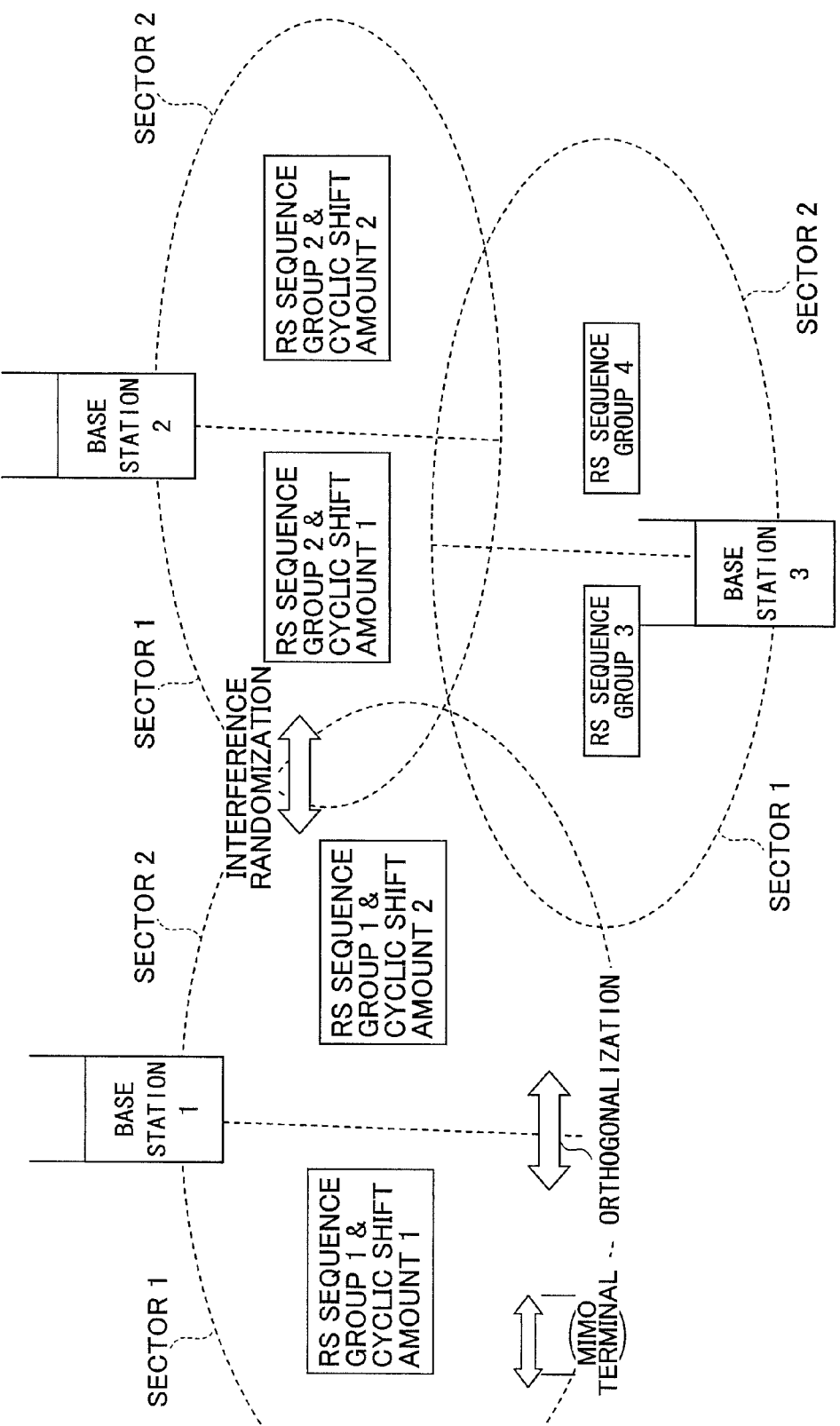

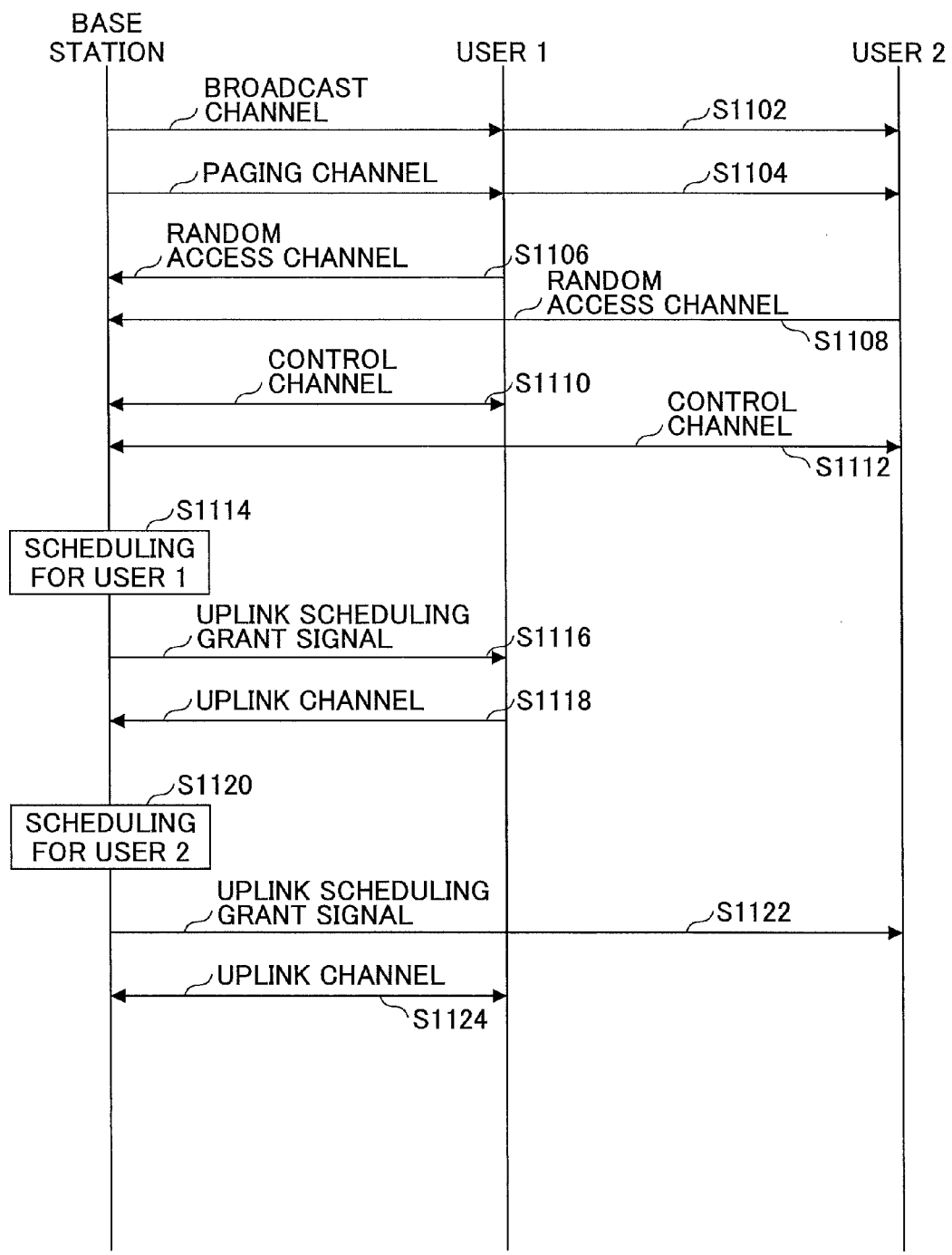

BASE STATION, MOBILE STATION, RADIO COMMUNICATION SYSTEM, AND COMMUNICATION CONTROL METHOD

CROSS-REFERENCE TO RELATED APPLICATIONS

This is a continuation application of U.S. patent application Ser. No. 12/531,521 filed on Sep. 16, 2009.

TECHNICAL FIELD

The present invention generally relates to a radio communication system. More particularly, the present invention relates to a base station, a mobile station, a radio communication system, and a communication control method.

BACKGROUND ART

A successor communication system to W-CDMA and HSDPA, i.e., Long Term Evolution (LTE), is currently being discussed by 3GPP, a standardization group for W-CDMA. In LTE, orthogonal frequency division multiplexing (OFDM) is to be used as a downlink radio access method and single-carrier frequency division multiple access (SC-FDMA) is to be used as an uplink radio access method (see, for example, 3GPP TR 25.814 (V7.0.0), "Physical Layer Aspects for Evolved UTRA," June 2006).

In OFDM, a frequency band is divided into multiple narrow frequency bands (subcarriers) and data are transmitted on the subcarriers. The subcarriers are densely arranged along the frequency axis such that they partly overlap each other but do not interfere with each other. This approach enables high-speed transmission and improves frequency efficiency.

In SC-FDMA, a frequency band is divided into multiple frequency bands and the frequency bands are allocated to different terminals for transmission in order to reduce interference between the terminals. Also, SC-FDMA reduces variation of the transmission power and therefore makes it possible to reduce power consumption of terminals and to achieve wide coverage.

A reference signal for uplink in E-UTRA indicates a pilot channel that is used for purposes such as synchronization, channel estimation for coherent detection, and measurement of received SINR in transmission power control. The reference signal is a transmission signal known to the receiving end, i.e., the base station, and is embedded at intervals in each subframe.

In W-CDMA, a user-specific PN sequence, more precisely, a signal sequence obtained by multiplying a long-cycle Gold sequence and an orthogonal sequence, is used as the reference signal (pilot channel). Since the PN sequence is long, it is possible to generate many different PN sequences. However, since the correlation properties of PN sequences are poor, the accuracy of channel estimation may become low. In other words, the interference between a pilot channel of a user and a pilot channel of another user may become high. Also, in a multipath environment, the autocorrelation between a pilot channel sequence and its delayed wave becomes high. In W-CDMA, simple reception processing such as RAKE reception is employed. Meanwhile, an E-UTRA system is designed to suppress the multipath interference based on highly-accurate channel estimation using, for example, an equalizer. For this reason, in E-UTRA, a constant amplitude and zero auto-correlation (CAZAC) sequence is used instead of a user-specific PN sequence.

The CAZAC sequence has excellent autocorrelation properties and cross-correlation properties and therefore enables highly-accurate channel estimation. In other words, compared with the PN sequence, the CAZAC sequence makes it possible to greatly improve the demodulation accuracy. With the CAZAC sequence, the variation in the amplitude of a signal is small both in the frequency domain and the time domain, i.e., the amplitude of the signal becomes comparatively flat. Meanwhile, with the PN sequence, the variation in the amplitude of a signal is large in the frequency domain. Thus, using the CAZAC sequence makes it possible to accurately perform channel estimation for each frequency using an equalizer. Also, since the autocorrelation of a transmitted CAZAC sequence becomes zero, it is possible to reduce the influence of multipath interference.

Still, the CAZAC sequence has problems as described below.

The number of sequences is small.

Since it is not possible to assign unique CAZAC sequences to respective users, it is necessary to repeatedly or cyclically assign a limited number of CAZAC sequences to multiple cells (hereafter, this is called "cell reuse"). The number of sequences becomes particularly small when the transmission band in SC-FDMA is narrow. In other words, when the transmission band in SC-FDMA is narrow, the symbol rate becomes low and the CAZAC sequence length decreases. In E-UTRA, a reference signal is time-division-multiplexed. Therefore, the symbol rate becomes low and the sequence length decreases when the transmission band is narrow. The number of sequences corresponds to the sequence length. For example, when the sequence length is 12 symbols in a transmission band of 180 kHz, it is not possible to assign user-specific sequences and therefore it is necessary to repeatedly or cyclically assign 12 sequences to multiple cells (may be greater than 12) such that the same sequence is not assigned to neighboring cells.

Cross-correlation between CAZAC sequences with different lengths varies rather greatly depending on the combination of the CAZAC sequences. When the cross-correlation is high, the accuracy of channel estimation is reduced.

Next, SC-FDMA used as an uplink radio access method in E-UTRA is described with reference to FIG. 1. In SC-FDMA, a system frequency band is divided into multiple resource blocks each of which includes one or more subcarriers. Each user device (user equipment: UE) is allocated one or more resource blocks. In frequency scheduling, to improve the transmission efficiency or the throughput of the entire system, resource blocks are allocated preferentially to user devices with good channel conditions according to received signal quality or channel quality indicators (CQIs) measured and reported based on downlink pilot channels for the respective resource blocks by the user devices. Frequency hopping where allocation of frequency blocks is varied according to a frequency hopping pattern may also be employed.

In FIG. 1, time and frequency resources allocated to different users are represented by different hatchings. For example, a relatively wide frequency band is allocated to UE2 in the first subframe, but a relatively narrow frequency band is allocated to UE2 in the next subframe. Different frequency bands are allocated to the respective users such that the frequency bands do not overlap.

In SC-FDMA, different time and frequency resources are allocated to respective users in a cell for transmission to achieve orthogonality between the users in the cell. Here, the minimum unit of the time and frequency resources is called a resource unit (RU). In SC-FDMA, a consecutive frequency band is allocated to each user to achieve single-carrier transmission with a low peak-to-average power ratio (PAPR). Allocation of the time and frequency resources in SC-FDMA is determined by a scheduler of the base station based on propagation conditions of respective users and the quality of service (QoS) of data to be transmitted. The QoS includes a data rate, a desired error rate, and a delay. Thus, in SC-FDMA, the system throughput is improved by allocating time and frequency resources providing good propagation conditions to respective users.

Respective base stations separately determine allocation of time and frequency resources. Therefore, a frequency band allocated in a cell may overlap a frequency band allocated in a neighboring cell. If frequency bands allocated in neighboring cells partly overlap, signals interfere with each other and their quality is reduced.

Next, a reference signal in uplink SC-FDMA is described with reference to FIG. 2. FIG. 2 shows an example of a subframe structure.

The packet length of a TTI called a subframe is 1 ms. One subframe includes 14 blocks to be submitted to FFT. Two of the 14 blocks are used for transmission of a reference signal and the remaining 12 blocks are used for transmission of data.

The reference signal is time-division-multiplexed with a data channel. The transmission bandwidth is dynamically changed according to the results of frequency scheduling by the base station. When the transmission bandwidth decreases, the symbol rate decreases and the sequence length of a reference signal to be transmitted in a fixed time period decreases. When the transmission bandwidth increases, the symbol rate increases and the sequence length of a reference signal to be transmitted in a fixed time period increases. When a reference signal is to be transmitted using a narrow band, for example, a 180 kHz band that equals one resource unit or 12 subcarriers, the number of symbols becomes 12. In this case, both the sequence length and the number of sequences become about 12. When a reference signal is to be transmitted using a wide band, for example, a 4.5 MHz band that equals 25 resource units or 300 subcarriers, the number of symbols becomes 300. In this case, both the sequence length and the number of sequences become about 300.

Meanwhile, orthogonalization of multiple reference signals by using cyclically-shifted CAZAC sequences is proposed. As shown in FIG. 3, when cyclically-shifted CAZAC sequences are used and all multipaths are within the amount of cyclic shift (cyclic shift amount), it is possible to orthogonalize reference signals of different users and antennas. Even when different users transmit the same sequence at the same timing using the same frequency band, it is possible to orthogonalize the users by cyclically shifting the sequence.

It is also proposed to orthogonalize two reference signals by employing orthogonal covering. In orthogonal covering, as shown in FIG. 4, users 1 and 2 may use different CAZAC sequences and different cyclic shift amounts as long as the same CAZAC sequence and the same cyclic shift amount are used for two reference signals in a subframe. With this approach, after the two reference signals are despread, the users become orthogonal with each other.

DISCLOSURE OF INVENTION

Problems to be Solved by the Invention

However, the above background art technologies have problems as described below.

When the same frequency band with the same bandwidth is used in the base station's own cell and an interfering cell, the cross-correlation (interference) between reference signals using CAZAC sequences becomes very low and therefore the communication quality is improved.

However, in SC-FDMA, since the frequency band and the bandwidth allocated to a user change from time to time according to scheduling results, it is rare that the same frequency band with the same bandwidth is allocated to both the user and an interfering station. In other words, in most cases, even if the bandwidths are the same, different frequency bands are allocated to the user and the interfering station. In such a case, the interference or correlation between a certain combination of CAZAC sequences may become high and the communication quality may be reduced. As described above, since the number of CAZAC sequences usable for reference signals is small, CAZAC sequences are assigned cell by cell. If one CAZAC sequence is always used for a bandwidth in a cell, interference may become continuously high in all frames and the communication quality may be reduced greatly depending on the combination of the bandwidth used in the cell and a bandwidth used in an interfering cell. In W-CDMA, the interval between reference signals is very long. Therefore, even if high interference is observed in a frame, it is expected that the interference decreases in a succeeding frame.

To prevent interference from becoming continuously high in temporally-consecutive frames, one of the following two methods may be employed: sequence hopping where different CAZAC sequences are used in the consecutive frames; and cyclic-shift hopping where the amount of cyclically shifting the CAZAC sequence in the time direction is changed (hopped) for each frame.

With the cyclic-shift hopping, since the number of cyclic shift amounts is limited to about six when the CP length and the delay spread are taken into account, the effect of interference randomization is limited. With the sequence hopping, a greater effect of interference randomization can be expected particularly when a wide frequency band is used, i.e., when a large number of sequences are available. However, when a narrow frequency band, for example, one resource unit (RU), is used, only about 12 sequences can be generated. Therefore, even if the CAZAC sequences are randomly changed (hopped), the same CAZAC sequence may be used about once in 12 frames in neighboring cells and as a result, a packet error may be caused.

One object of the present invention is to solve or reduce one or more of the above problems and to provide a base station, a mobile station, a radio communication system, and a communication control method that make it possible to flexibly reuse CAZAC reference signal sequences for multiple cells in an E-UTRA system and thereby to reduce the influence of characteristic degradation caused by cross-correlation.

Means for Solving the Problems

An aspect of the present invention provides a base station for communicating with a mobile station transmitting an uplink signal according to a single-carrier scheme. One of sequence groups each specifying reference signal sequences for respective radio resource bandwidths is assigned to the base station, a different one of the sequence groups is assigned to a neighboring cell, and the mobile station transmits the uplink signal including one of the reference signal sequences specified by one of the sequence groups assigned to the base station. The base station includes a scheduler configured to allocate radio resources such that one or more resource units are allocated to the mobile station for communication; a reporting unit configured to report the allocated radio resources and a cyclic shift amount to the mobile station; and a demodulating unit configured to demodulate the uplink signal received from the mobile station based on one of the reference signal sequences corresponding to one of the radio resource bandwidths and the cyclic shift amount. Cell reuse is applied to the reference signal sequences to be transmitted using one resource unit, and sequence hopping where different ones of the reference signal sequences are assigned to consecutive subframes is applied to the reference signal sequences to be transmitted using a bandwidth greater than one resource unit.

Another aspect of the present invention provides a mobile station transmitting an uplink signal according to a single-carrier scheme. The mobile station includes a storage unit configured to store sequence groups each specifying reference signal sequences for respective radio resource bandwidths; a transmitting unit configured to determine one of the reference signal sequences corresponding to one of the radio resource bandwidths based on radio resources allocated by a base station, to shift the determined one of the reference signal sequences by a cyclic shift amount assigned by the base station, and to transmit the uplink signal including the shifted one of the reference signal sequences. Cell reuse is applied to the reference signal sequences to be transmitted using one resource unit, and sequence hopping where different ones of the reference signal sequences are assigned to consecutive subframes is applied to the reference signal sequences to be transmitted using a bandwidth greater than one resource unit.

Another aspect of the present invention provides a radio communication system including a mobile station configured to transmit an uplink signal according to a single-carrier scheme; and a base station configured to communicate with the mobile station. One of sequence groups each specifying reference signal sequences for respective radio resource bandwidths is assigned to the base station, and a different one of the sequence groups is assigned to a neighboring cell. The mobile station is configured to transmit the uplink signal including one of the reference signal sequences specified by one of the sequence groups assigned to the base station. The base station includes a scheduler configured to allocate radio resources such that one or more resource units are allocated to the mobile station for communication, a reporting unit configured to report the allocated radio resources and a cyclic shift amount to the mobile station, and a demodulating unit configured to demodulate the uplink signal received from the mobile station based on one of the reference signal sequences corresponding to one of the radio resource bandwidths and the cyclic shift amount. The mobile station includes a storage unit configured to store the sequence groups; and a transmitting unit configured to determine one of the reference signal sequences corresponding to one of the radio resource bandwidths based on the radio resources allocated by the base station, to shift the determined one of the reference signal sequences by the cyclic shift amount reported by the base station, and to transmit the uplink signal including the shifted one of the reference signal sequences. Cell reuse is applied to the reference signal sequences to be transmitted using one resource unit, and sequence hopping where different ones of the reference signal sequences are assigned to consecutive subframes is applied to the reference signal sequences to be transmitted using a bandwidth greater than one resource unit.

Still another aspect of the present invention provides a communication control method used in a radio communication system including a mobile station transmitting an uplink signal according to a single-carrier scheme and a base station communicating with the mobile station. One of sequence groups each specifying reference signal sequences for respective radio resource bandwidths is assigned to the base station and a different one of the sequence groups is assigned to a neighboring cell. The method including a radio resource allocation step, performed by the base station, of allocating radio resources such that one or more resource units are allocated to the mobile station for communication; a reporting step, performed by the base station, of reporting the allocated radio resources and a cyclic shift amount to the mobile station; a transmitting step, performed by the mobile station, of transmitting the uplink signal based on the radio resources and the cyclic shift amount reported by the base station; and a demodulating step, performed by the base station, of demodulating the uplink signal received from the mobile station based on one of the reference signal sequences corresponding to one of the radio resource bandwidths and the cyclic shift amount. Cell reuse is applied to the reference signal sequences to be transmitted using one resource unit, and sequence hopping where different ones of the reference signal sequences are assigned to consecutive subframes is applied to the reference signal sequences to be transmitted using a bandwidth greater than one resource unit.

Advantageous Effect of the Invention

An aspect of the present invention provides a base station, a mobile station, a radio communication system, and a communication control method that make it possible to flexibly reuse CAZAC reference signal sequences for multiple cells in an E-UTRA system and thereby to reduce the influence of characteristic degradation caused by cross-correlation.

BRIEF DESCRIPTION OF THE DRAWINGS

FIG. 6 is a table showing exemplary assignment of reference signal sequences according to an embodiment of the present invention;

FIG. 7 is a partial block diagram of a base station according to an embodiment of the present invention;

FIG. 8 is a partial block diagram of a mobile station according to an embodiment of the present invention;

FIG. 9 is a drawing illustrating an exemplary method of assigning reference signal sequences according to an embodiment of the present invention;

FIG. 10 is a drawing illustrating selective use of orthogonalization and interference randomization for base stations according to an embodiment of the present invention; and FIG. 11 is a flowchart showing a process in a radio communication system according to an embodiment of the present invention.

EXPLANATION OF REFERENCES

Figure 1:
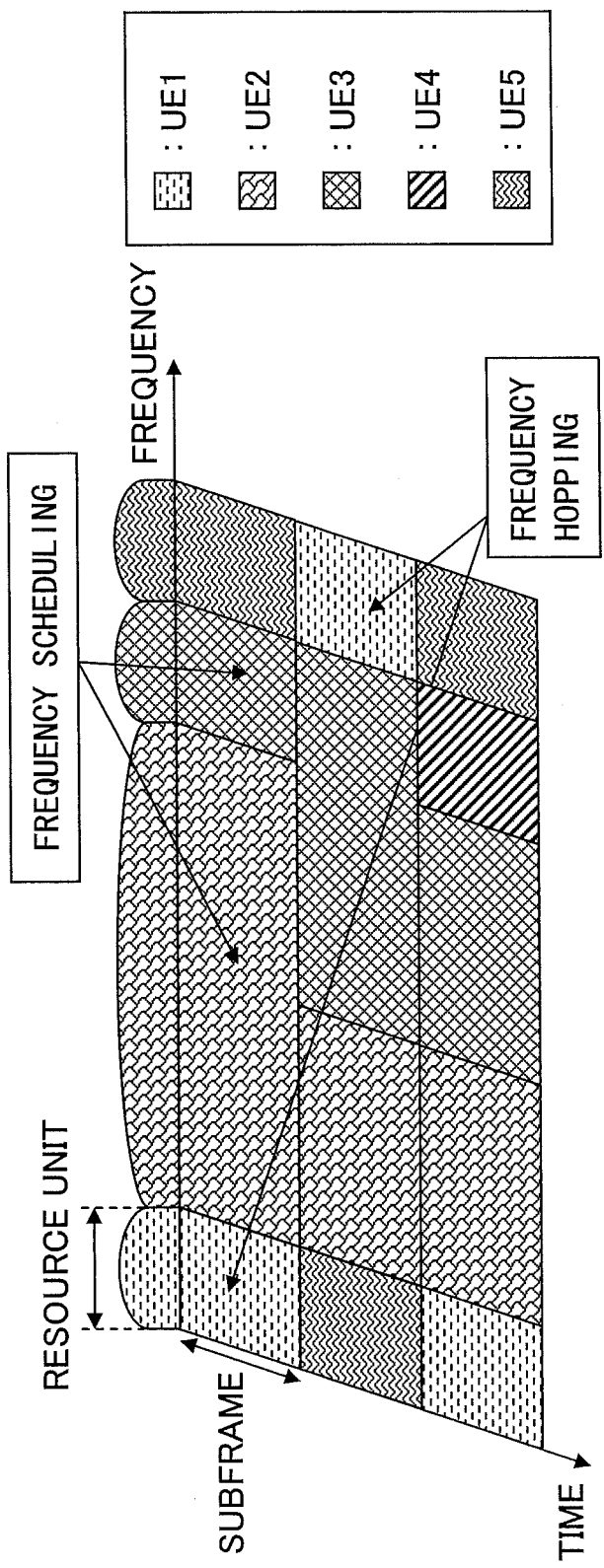
FIG. 1 is a drawing illustrating single-carrier FDMA.
Figure 2:
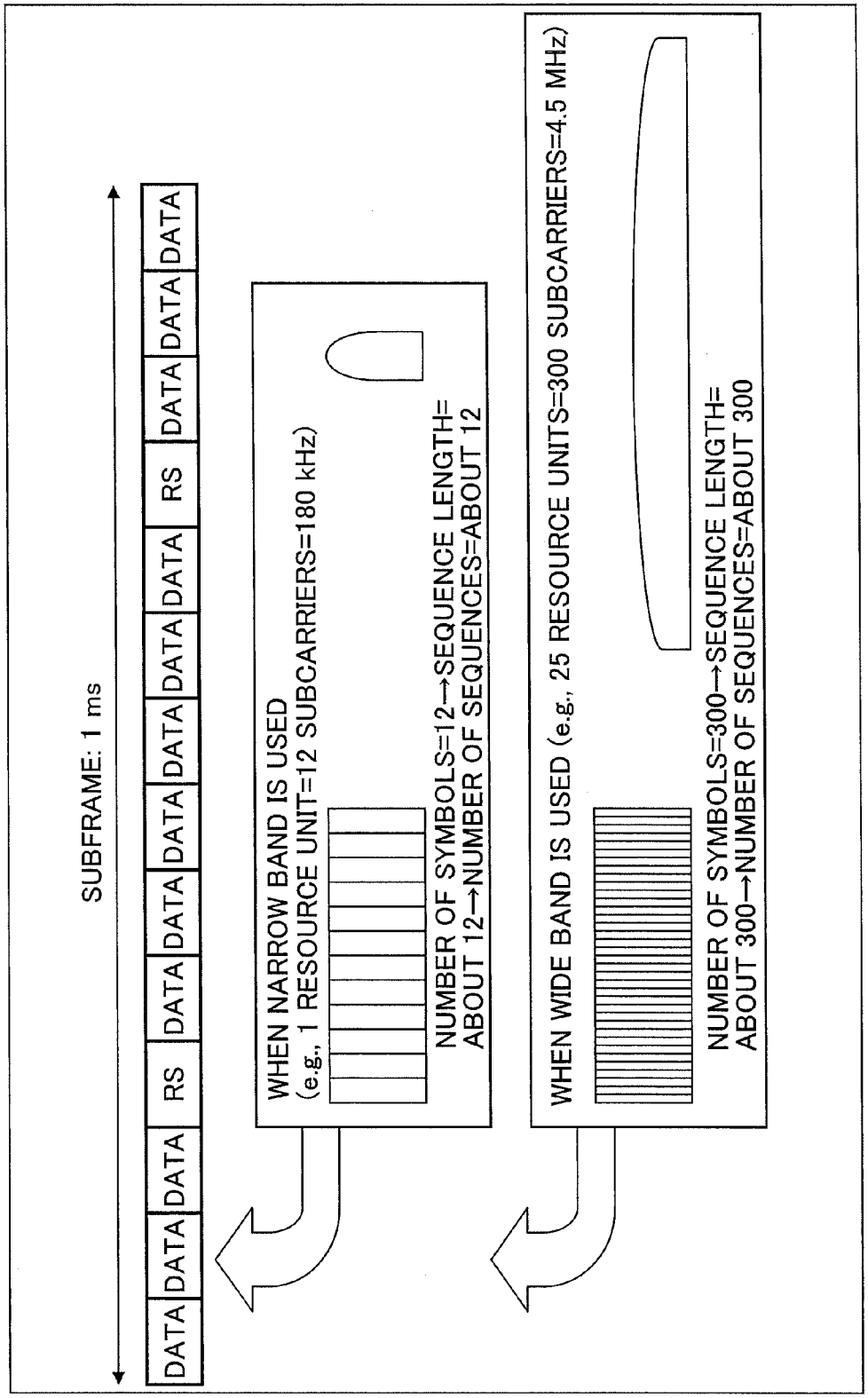
FIG. 2 is a drawing illustrating reference signals used in single-carrier FDMA.
Figure 3:
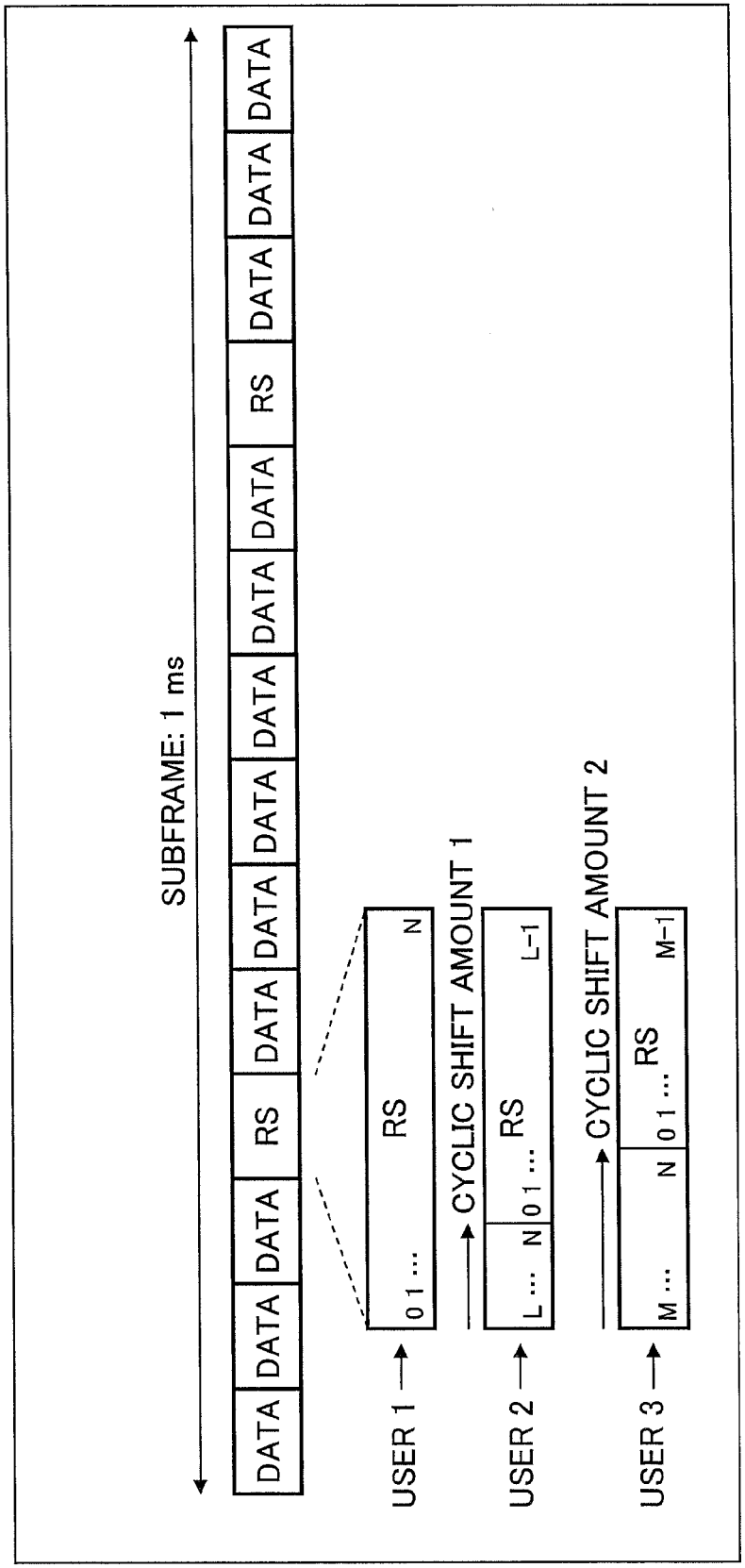
FIG. 3 is a drawing illustrating reference signals used in single-carrier FDMA.
Figure 4:
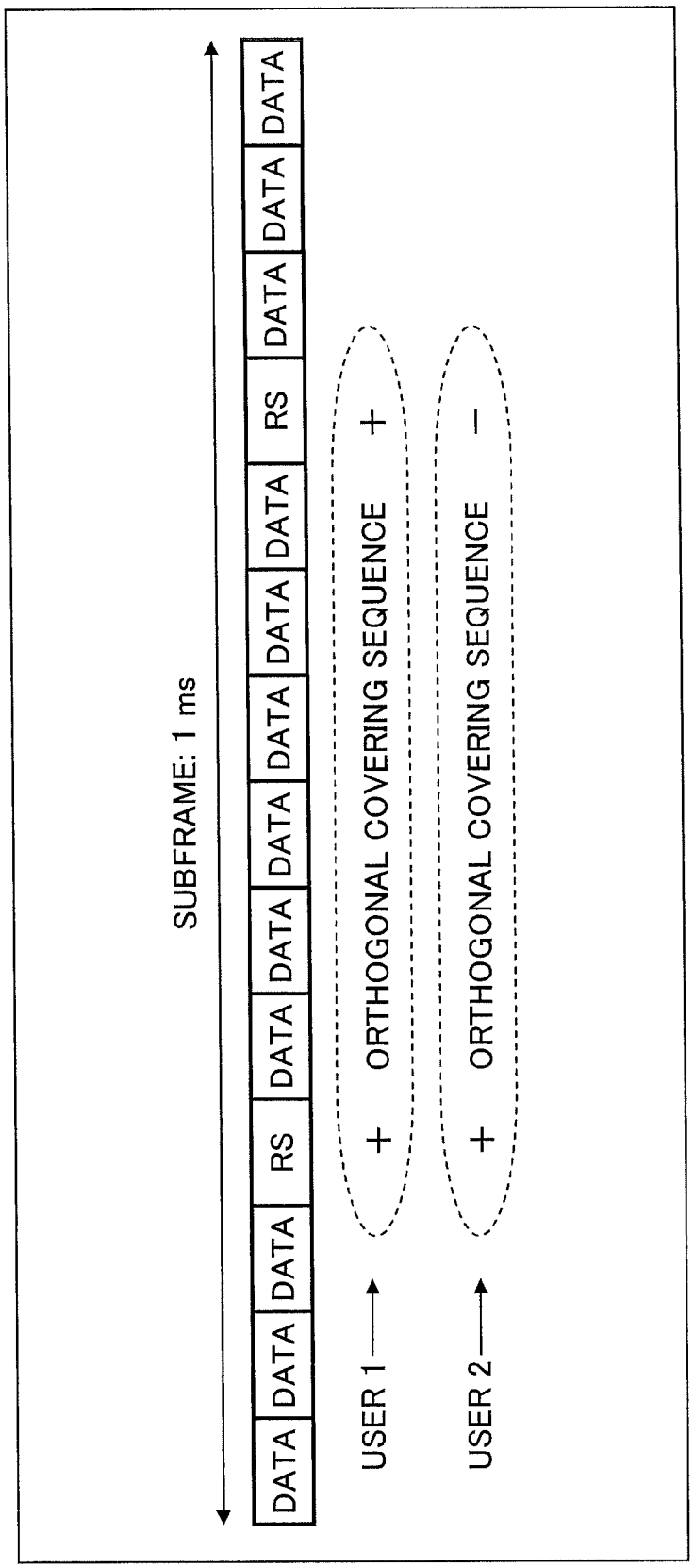
FIG. 4 is a drawing illustrating reference signals used in single-carrier FDMA.

50 Cell
$100_1, 100_2, 100_3, 100_n$ Mobile station
102 OFDM signal demodulation unit
104 Uplink-scheduling-grant-signal demodulation/decoding unit
106 Broadcast-channel demodulation/decoding unit 108 Other-control-and-data-signals demodulation/decoding unit
110 Radio-frame-number-and-subframe-number counter
112 Cyclic-shift-amount determining unit
114 Memory for storing RS sequence numbers associated with bandwidths in RS sequence groups
116 Demodulation RS generating unit
118 Channel coding unit
120 Data modulation unit
122 SC-FDMA modulation unit
200 Base station
202 Broadcast channel generating unit
204 OFDM signal generating unit
206 Radio-frame-number-and-subframe-number management unit
208 Uplink-scheduling-grant-signal-transmission-control-signal generating unit
210 Memory for storing RS sequence numbers associated with bandwidths in RS sequence groups
212 Cyclic-shift-number determining unit
214 Demodulation RS generating unit
216 Synchronization-detection/channel-estimation unit
218 Channel decoding unit
220 Coherent detection unit
222 Uplink-channel-condition estimation unit
224 Scheduler
300 Access gateway
400 Core network

BEST MODE FOR CARRYING OUT THE INVENTION

Embodiments of the present invention are described below with reference to the accompanying drawings. Throughout the accompanying drawings, the same reference numbers are used for parts having the same functions, and overlapping descriptions of those parts are omitted.

Figure 5:
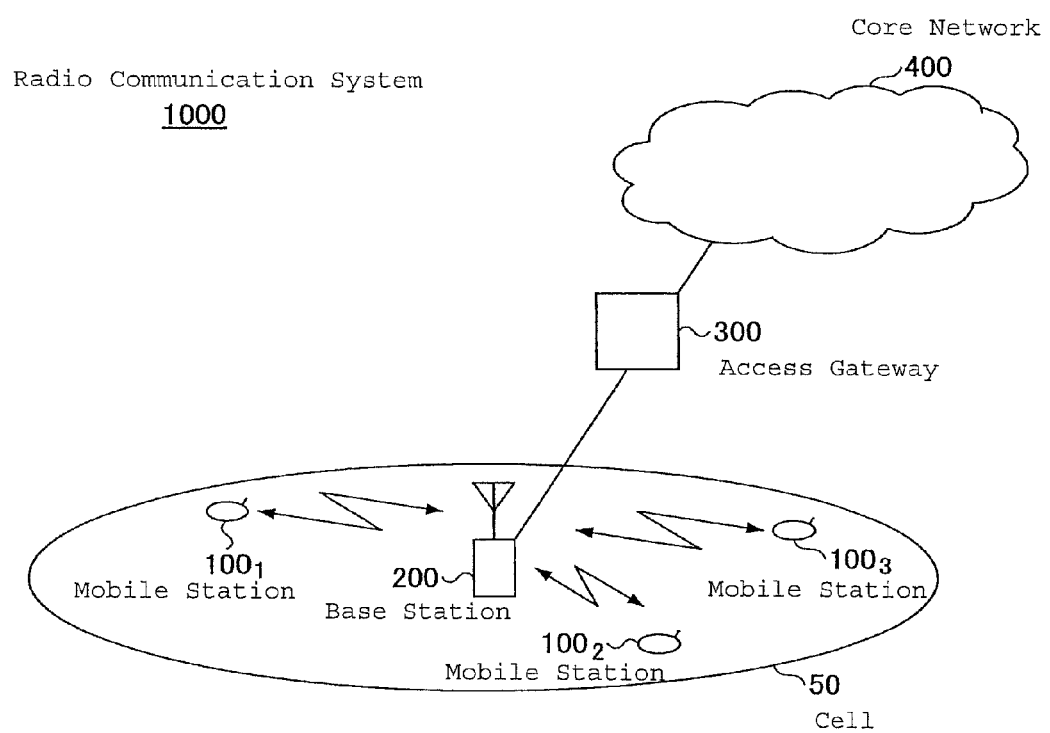
FIG. 5 is a drawing illustrating a radio communication system according to an embodiment of the present invention.

A radio communication system 1000 including mobile stations and a base station according to an embodiment of the present invention is described below with reference to FIG. 5.

The radio communication system 1000 is based on, for example, Evolved UTRA and UTRAN (also called Long Term Evolution or Super 3G). The radio communication system 1000 includes a base station (eNode B: eNB) 200 and mobile stations $100_n$ ($100_1$, $100_2$, $100_3$, ... $100_n$; n is an integer greater than 0). The base station 200 is connected to an upper node such as an access gateway 300 and the access gateway 300 is connected to a core network 400. The mobile stations $100_n$ are in a cell 50 and communicate with the base station 200 according to Evolved UTRA and UTRAN.

The mobile stations $100_n$ ($100_1$, $100_2$, $100_3$ ... $100_n$) have the same configuration and functions and are therefore called the mobile station $100_n$ or the mobile stations $100_n$ in the descriptions below unless otherwise mentioned. In the descriptions below, mobile stations are used as examples of user equipment (UE) communicating with a base station. However, user equipment communicating with a base station may also include fixed terminals.

In the radio communication system 1000, orthogonal frequency division multiplexing (OFDM) is used as the downlink radio access method and single-carrier frequency division multiple access (SC-FDMA) is used as the uplink radio access method. As described above, OFDM is a multicarrier transmission scheme where a frequency band is divided into multiple narrow frequency bands (subcarriers) and data are mapped to the subcarriers for transmission. Meanwhile, SC-FDMA is a single-carrier transmission scheme where a frequency band is divided into multiple frequency bands and the frequency bands are allocated to different terminals in order to reduce interference between the terminals.

Communication channels used in Evolved UTRA and UTRAN are described below.

For downlink, a physical downlink shared channel (PDSCH) shared by the mobile stations $100_n$ and a physical downlink control channel (PDCCH) are used. The physical downlink control channel is also called a downlink L1/L2 control channel. The physical downlink shared channel is used to transmit user data, i.e., a normal data signal.

For uplink, a physical uplink shared channel (PUSCH) shared by the mobile stations $100_n$ and a physical uplink control channel are used. The physical uplink shared channel is used to transmit user data, i.e., a normal data signal. The physical uplink control channel is used to transmit a downlink channel quality indicator (CQI) used for scheduling and adaptive modulation and coding (AMC) of the physical downlink shared channel, and acknowledgement information for the physical downlink shared channel. The acknowledgement information includes either acknowledgement (ACK) indicating normal reception of a transmitted signal or negative acknowledgement (NACK) indicating abnormal reception of a transmitted signal.

The physical uplink control channel may also be used to transmit, in addition to the CQI and the acknowledgement information, a scheduling request for requesting allocation of resources of an uplink shared channel and a release request used in persistent scheduling. Here, allocation of resources of an uplink shared channel indicates a process where a base station reports to a mobile station by using the physical downlink control channel in a subframe that the mobile station is allowed to communicate using the uplink shared channel in a subsequent subframe.

In the radio communication system 1000 of this embodiment, cell reuse is applied but sequence hopping is not applied to sequences used for reference signals (RS) using a narrow bandwidth. Meanwhile, sequences used for reference signals using a wide bandwidth are divided into groups the number of which is the same as the total number of sequences used for reference signals using a narrow bandwidth. The sequences in each group are assigned to different subframes, i.e., sequence hopping is performed using the sequences in each group. The total number of sequences used for reference signals using a narrow bandwidth is equal to the cell reuse number. Hereafter, the groups of reference signal sequences associated with various bandwidths are called sequence groups. The number of the sequence groups is the same as the total number of sequences used for reference signals using a narrow bandwidth. This approach makes it possible to assign one of the sequence groups to a cell and to assign another one of the sequence groups to a neighboring cell.

Thus, in this embodiment, sequence hopping is not employed for reference signals using a narrow bandwidth, and sequence hopping is employed for reference signals using a wide bandwidth. As a result, the combination of used sequences changes from subframe to subframe. This in turn makes it possible to prevent continuous occurrence of high interference and thereby to reduce the probability of successive packet errors.

Let us assume that the number of reference signal (RS) sequences for the narrowest bandwidth $W_1$ is $N_1$ and the number of RS sequences for a bandwidth $W_x$ that is X times greater than $W_1$ is $XN_1$. The number of sequences depends on the sequence length when CAZAC sequences are used, and the sequence length is in proportion to the bandwidth in E-UTRA where the transmission interval of the reference signal is constant regardless of the bandwidth. Therefore, in E-UTRA, the number of sequences is proportional to the bandwidth.

In this embodiment, $N_1$ RS sequence groups are generated and a kth RS sequence group (k is an integer greater than or equal to 1 and less than or equal to $N_1$) for a bandwidth $W_x$ includes $(W_x/W_1)$ sequences with sequence numbers k, $k+N_1, \ldots$, and $k+(W_x/W_1)N_1$. With this method, an RS sequence does not belong to multiple RS sequence groups at the same time. In each cell, one of the $N_1$ RS sequence groups is selected and used. Sequence hopping is performed using only the RS sequences assigned to the same bandwidth in the selected RS sequence group.

In the example shown in FIG. 6, one resource unit (RU) is the narrowest bandwidth and one RS sequence is provided for each RU in each of RS sequence groups 1-12. In FIG. 6, RS sequence [A, B] indicates the Bth sequence of RS sequences for a transmission bandwidth A.

For example, RS sequence group 1 is assigned to base station #1, RS sequence group 2 is assigned to base station #2, . . . , and RS sequence group 12 is assigned to base station #12. Thus, cell reuse where a set of sequence groups are cyclically assigned to different cells is employed in this embodiment. When a narrow bandwidth, for example, 1 RU, is used, sequence hopping is not employed, but cell reuse where a set of RS sequences are cyclically assigned to different cells is employed. For example, RS sequence 1 is assigned to base station #1, RS sequence 2 is assigned to base station #2, . . . , and RS sequence 12 is assigned to base station #12. When 2 RUs are used, i.e., when the bandwidth of the reference signal is doubled, the number of sequences is also doubled. The doubled sequences are divided into groups the number of which equals the minimum number of sequences (12) such that each group includes a pair of sequences to be assigned to a cell. The pair of sequences in a group do not belong to other groups at the same time. Sequence hopping is performed between the pair of sequences. For example, in a base station to which RS sequence group 1 is assigned, sequence 1 is used when the bandwidth is 1 RU and sequences 1 and 13 are used when the bandwidth is 2 RUs. Similarly, in a neighboring cell, sequence 2 is used when the bandwidth is 1 RU and sequences 2 and 14 are used when the bandwidth is 2 RUs.

This approach makes it possible to prevent use of the same RS sequence in neighboring cells and also to randomize the interference by sequence hopping.

Next, the base station 200 of this embodiment is described with reference to FIG. 7.

The base station 200 of this embodiment includes a broadcast channel generating unit 202, an OFDM signal generating unit 204, a radio-frame-number-and-subframe-number management unit 206, an uplink-scheduling-grant-signal-transmission-control-signal generating unit 208, a memory 210 for storing RS sequence numbers associated with bandwidths in RS sequence groups, a cyclic-shift-number determining unit 212, a demodulation RS generating unit 214, a synchronization-detection/channel-estimation unit 216, a channel decoding unit 218, a coherent detection unit 220, an uplink-channel-condition estimation unit 222, and a scheduler 224.

When cells are designed (base stations are installed), an uplink RS sequence group (number) is assigned to each cell. For each sequence group, sequence hopping patterns based on subframe numbers are predetermined by specifications for bandwidths of two or more RUs. Accordingly, different RS sequence groups (numbers) are assigned to neighboring base stations. This approach makes it possible to randomize the interference.

An RS sequence group number assigned to the base station 200 is input to the broadcast channel generating unit 202 and the memory 210.

The broadcast channel generating unit 202 generates a broadcast channel including the input RS sequence group number and a system frame number input from the radio-frame-number-and-subframe-number management unit 206 described later, and inputs the broadcast channel to the OFDM signal generating unit 204. The OFDM signal generating unit 204 generates an OFDM signal including the broadcast channel and inputs the OFDM signal to a radio transmitter. As a result, the assigned uplink RS sequence group is reported via the broadcast channel to all users in the cell.

Meanwhile, uplink channels received from the mobile stations $100_n$ are input to the synchronization-detection/channel-estimation unit 216, the coherent detection unit 220, and the uplink-channel-condition estimation unit 222.

The synchronization-detection/channel-estimation unit 216 performs synchronization detection for the input received signals to estimate their reception timings, performs channel estimation based on demodulation reference signals input from the demodulation RS generating unit 214 described later, and inputs the channel estimation results to the coherent detection unit 220.

The coherent detection unit 220 performs coherent detection for the received signals based on the channel estimation results and allocated frequencies and bandwidths input from the scheduler 224 described later, and inputs the demodulated received signals to the channel decoding unit 218. The channel decoding unit 218 decodes the demodulated received signals and generates reproduced data signals corresponding to selected user numbers input from the scheduler 224. The generated reproduced data signals are transmitted to a network.

The uplink-channel-condition estimation unit 222 estimates uplink channel conditions of respective users based on the input received signals and inputs the estimated uplink channel conditions to the scheduler 224.

The scheduler 224 performs, for example, frequency scheduling based on the input uplink channel conditions of the respective users and QoS information of the users such as requested data rates, buffer statuses, desired error rates, and delays. Then, the scheduler 224 inputs allocated frequencies and bandwidths to the uplink-scheduling-grant-signal-transmission-control-signal generating unit 208, the memory 210, and the coherent detection unit 220, and inputs selected user numbers to the uplink-scheduling-grant-signal-transmission-control-signal generating unit 208 and the channel decoding unit 218.

The cyclic-shift-number determining unit 212 determines cyclic shift numbers based on, for example, cooperative control signals transmitted between synchronized cells and inputs the cyclic shift numbers to the uplink-scheduling-grant-signal-transmission-control-signal generating unit 208 and the demodulation RS generating unit 214. The cyclic shift numbers are associated with cyclic shift amounts. Assignment of the cyclic shift numbers is reported to the mobile stations $100_n$ via, for example, a broadcast channel.

The radio-frame-number-and-subframe-number management unit 206 manages radio frame numbers and subframe numbers, inputs a system frame number to the broadcast channel generating unit 202, and inputs the radio frame numbers and the subframe numbers to the memory 210.

The memory 210 stores the correspondence between RS sequence group numbers, bandwidths in respective RS sequence groups, and RS sequence numbers as shown in FIG.

6. Also, the memory 210 selects RS sequence numbers corresponding to the allocated bandwidths input from the scheduler 224 and inputs the selected RS sequence numbers to the demodulation RS generating unit 214.

The demodulation RS generating unit 214 generates demodulation RSs based on the RS sequence numbers input from the memory 210 and the cyclic shift numbers input from the cyclic-shift-number determining unit 212, and inputs the demodulation RSs to the synchronization-detection/channel-estimation unit 216.

The uplink-scheduling-grant-signal-transmission-control-signal generating unit 208 generates a control signal (uplink-scheduling-grant-signal transmission control signal) including the allocated frequencies and bandwidths, the selected user numbers, and the assigned cyclic shift numbers, and inputs the control signal to the OFDM signal generating unit 204. The OFDM signal generating unit 204 generates an OFDM signal including the control signal and inputs the OFDM signal to the radio transmitter. As a result, the control signal is transmitted to scheduled users via a downlink control channel.

The OFDM signal generating unit 204 also generates an OFDM signal including downlink channels other than the broadcast channel and the control channel such as a downlink reference signal, a data channel, and a paging channel, and inputs the OFDM signal to the radio transmitter. As a result, the downlink channels are transmitted to the users.

Next, the mobile station $100_n$ of this embodiment is described with reference to FIG. 8.

The mobile station $100_n$ of this embodiment includes an OFDM signal demodulation unit 102, an uplink-scheduling-grant-signal demodulation/decoding unit 104, a broadcast-channel demodulation/decoding unit 106, an other-control-and-data-signals demodulation/decoding unit 108, a radio-frame-number-and-subframe-number counter 110, a cyclic-shift-amount determining unit 112, a memory 114 for storing RS sequence numbers associated with bandwidths in RS sequence groups, a demodulation RS generating unit 116, a channel coding unit 118, a data modulation unit 120, and an SC-FDMA modulation unit 122. The mobile station $100_n$ decodes an uplink scheduling grant signal and if a selected user number corresponding to the mobile station $100_n$ is included in the uplink scheduling grant signal, generates and transmits a transmission signal.

A received signal from the base station 200 is input to the OFDM signal demodulation unit 102. The OFDM signal demodulation unit 102 demodulates the received signal, inputs the uplink-scheduling-grant-signal transmission control signal to the uplink-scheduling-grant-signal demodulation/decoding unit 104, inputs the broadcast channel to the broadcast-channel demodulation/decoding unit 106, and inputs control and data signals other than the uplink-scheduling-grant-signal transmission control signal and the broadcast channel to the other-control-and-data-signals demodulation/decoding unit 108.

The broadcast-channel demodulation/decoding unit 106 demodulates and decodes the input broadcast channel, inputs the RS sequence group number to the memory 114, and inputs the system frame number to the radio-frame-number-and-subframe-number counter 110.

The radio-frame-number-and-subframe-number counter 110 counts radio frame numbers and subframe numbers and inputs the radio frame numbers and the subframe numbers to the memory 114.

The uplink-scheduling-grant-signal demodulation/decoding unit 104 demodulates and decodes the input uplink scheduling grant signal, inputs the assigned cyclic shift number to the cyclic-shift-amount determining unit 112, inputs the allocated frequency to the SC-FDMA modulation unit 122, and inputs the allocated bandwidth to the memory 114.

The memory 114 stores the correspondence between bandwidths in respective RS sequence groups and RS sequence numbers as shown in FIG. 6. The memory 114 also stores the correspondence between RS sequence numbers and bandwidths in an RS sequence group assigned to the serving cell and reported by the base station 200. Further, the memory 114 selects an RS sequence number based on the RS sequence group number input from the broadcast-channel demodulation/decoding unit 106 and the allocated bandwidth input from the uplink-scheduling-grant-signal demodulation/decoding unit 104, and inputs the selected RS sequence number to the demodulation RS generating unit 116.

The cyclic-shift-amount determining unit 112 determines a cyclic shift amount corresponding to the assigned cyclic shift number input from the uplink-scheduling-grant-signal demodulation/decoding unit 104, and inputs the determined cyclic shift amount to the demodulation RS generating unit 116.

The demodulation RS generating unit 116 generates a demodulation RS based on the input RS sequence number and cyclic shift amount, and inputs the demodulation RS to the SC-FDMA modulation unit 122.

Meanwhile, the channel coding unit 118 performs channel coding on user data. Then, the data modulation unit 120 performs data modulation on the channel-coded user data and inputs the modulated user data to the SC-FDMA modulation unit 122.

The SC-FDMA modulation unit (DFT-spread OFDM) 122 modulates the input demodulation RS and the user data based on the allocated frequency and outputs a transmission signal.

Next, an exemplary method of assigning reference signal sequences is described with reference to FIG. 9.

In FIG. 9, it is assumed that RS sequence group 2 has already been assigned to a base station $200_1$ and an RS sequence group is to be assigned to a base station $200_2$.

An RS sequence group different from RS sequence group 2 assigned to the base station $200_1$ is selected for the base station $200_2$ to randomize the interference (step S902). For example, RS sequence group 1 is selected for the base station $200_2$.

Uplink RS sequence groups are assigned to respective cells when the cells are designed (base stations are installed) (step S904). For each sequence group, sequence hopping patterns based on subframe numbers are predetermined by specifications.

The base station $200_2$ reports the assigned uplink RS sequence group via a broadcast channel to all users in the cell (step S906).

The base station $200_2$ also reports cyclic shift amounts together with bandwidth allocation information to scheduled users via a downlink control channel (step S908).

Each scheduled mobile station (terminal) $100_n$ determines an RS sequence used for the allocated bandwidth based on a table (FIG. 6) corresponding to the reported RS sequence group and an allocated subframe number, shifts the determined RS sequence by the cyclic shift amount reported via the control channel, and transmits an uplink channel including the shifted RS sequence (step S910).

In this embodiment, assigned reference signal sequence numbers are reported to terminals by reporting a sequence group number assigned to the serving cell to the terminal. Alternatively, cell IDs may be associated with sequence group numbers in advance, or reference signal sequence numbers may be reported from the serving cell to scheduled terminals together with control information indicating a scheduling grant (uplink-scheduling-grant-signal transmission control signal). Associating cell IDs with sequence group numbers in advance eliminates the need to report the sequence group numbers to terminals.

In this embodiment, hopping patterns used for each sequence group are predetermined, i.e., sequence hopping patterns based on subframe numbers are predetermined by specifications for each sequence group. Alternatively, hopping patterns may be reported to terminals from the base station. For example, hopping patterns may be reported via a broadcast channel, or hopping patterns determined by dynamic hopping control may be reported.

Also in this embodiment, the cyclic shift amount is reported as a part of format information for the uplink reference signal. More specifically, cyclic shift amounts associated with cyclic shift numbers are predetermined by the base station taking into account the cell radius and the delay spread and reported to terminals via a broadcast channel; and assigned cyclic shift amounts are reported dynamically to the terminals together with the scheduling grant. For example, the correspondence between cyclic shift numbers and cyclic shift amounts is predetermined and reported via broadcast information, and after cyclic shift amounts are assigned, the corresponding cyclic shift numbers are reported to the terminals.

Also, orthogonal covering sequences may be reported as the format information for uplink reference signals. Orthogonal covering may be used for orthogonalization of multiple antennas of a MIMO user. When a user is requested to use MIMO, the user orthogonalizes reference signals from multiple antennas by orthogonal covering without additional signaling. With orthogonal covering, the same CAZAC sequence and the same cyclic shift amount are used for two reference signals in a subframe. The orthogonal covering may also be used for orthogonalization of users. In this case, orthogonal covering sequences are reported dynamically together with the scheduling grant.

Next, selective use of orthogonalization and interference randomization is described with reference to FIG. 10.

In FIG. 10, it is assumed that uplink transmission timings of base station #1, base station #2, and base station #3 are asynchronous. Each base station covers two sectors and transmission timings of sectors belonging to the same base station can be synchronized.

The sectors can be orthogonalized by using different cyclic shift amounts even if the same RS sequence group is assigned. For example, although the same RS sequence group 1 is assigned to sectors 1 and 2 of base station #1, sectors 1 and 2 can be orthogonalized because different cyclic shift amounts are used. Similarly, although the same RS sequence group is assigned to sectors 1 and 2 of base station #2, sectors 1 and 2 can be orthogonalized because different cyclic shift amounts are used.

Also, the interference between base stations #1 and #2 can be randomized by assigning different RS sequence groups to base stations #1 and #2. In this example, the interference is randomized by assigning RS sequence group 1 to base station #1 and assigning RS sequence group 2 to base station #2.

In the case of a MIMO terminal, multiple antennas can be orthogonalized by orthogonal covering or by cyclic shifting.

Also, different RS sequence groups may be assigned even to synchronized cells (e.g., sectors 1 and of base station #3) to achieve interference randomization.

As described above, in this example, it is assumed that the base stations are not synchronized. In a case where base stations are synchronized, the same RS sequence group and different cyclic shift amounts may be assigned to the base stations to orthogonalize users using the same frequency band with the same bandwidth. Next, a process in the radio communication system 1000 of this embodiment is described with reference to FIG. 11.

Here, it is assumed that an RS sequence group is assigned in advance to the base station 200. In each user terminal, information regarding all RS sequence groups available in the system (correspondence between sequence groups and RS sequences and correspondence between RS sequences and subframe/radio frame numbers (hopping patterns)) is stored in advance. User terminal 2 employs multi-antenna MIMO.

The base station 200 transmits system information via a broadcast channel (step S1102). For example, the base station 200 broadcasts an RS sequence group number and a system frame number.

The base station 200 also transmits a paging channel (step S1104). For example, the base station 200 transmits a paging channel to page user terminals 1 and 2, i.e., when there are incoming calls for the user terminals 1 and 2.

In response to the paging channel, the user terminals 1 and 2 transmit random access channels for initial access (steps S1106 and S1108), The base station 200 and the user terminals 1 and 2 exchange control channels (steps S1110 and S1112). As a result, radio links are established between the base station 200 and the user terminals 1 and 2. At this stage, the base station 200 recognizes that the user terminal 2 is a MIMO terminal.

After the above steps are conducted, packet communications based on downlink scheduling are enabled. The user terminals 1 and 2 transmit wideband sounding reference signals for CQI measurement at predetermined intervals.

The base station 200 performs scheduling for the user terminal 1 (step S1114).

The base station 200 transmits an uplink scheduling grant signal to the user terminal 1 (step S1116). The uplink scheduling grant signal includes a selected user number, an allocated frequency band for uplink, and an assigned cyclic shift number.

The user terminal 1 determines an assigned RS sequence based on the allocated bandwidth, the subframe number, and the radio frame number used for transmission. The user terminal 1 shifts the RS sequence by a cyclic shift amount corresponding to the cyclic shift number reported by the uplink scheduling grant signal and transmits an uplink channel including the shifted RS sequence (step S1118).

The base station 200 performs scheduling for the user terminal 2 (step S1120).

The base station 200 transmits an uplink scheduling grant signal to the user terminal 2 (step S1122). The uplink scheduling grant signal includes a selected user number, an allocated frequency band for uplink, and an assigned cyclic shift number.

The user terminal 2 determines an assigned RS sequence based on the allocated bandwidth, the subframe number, and the radio frame number used for transmission. The user terminal 2, which is a MIMO terminal, shifts the RS sequence by a cyclic shift amount corresponding to the cyclic shift number reported by the uplink scheduling grant signal and transmits the shifted RS sequence from respective antennas 1 and 2 after multiplying the RS sequence by the corresponding orthogonal covering sequence predetermined by the system (step S1124).

The descriptions and drawings in the above embodiments should not be construed to be limiting the present invention. A person skilled in the art may think of variations of the above embodiments from the descriptions.

In other words, the present invention may also include various embodiments not disclosed above. Therefore, the technical scope of the present invention should be determined based on proper understanding of the claims with reference to the above descriptions.

Although the present invention is described above in different embodiments, the distinctions between the embodiments are not essential for the present invention, and the embodiments may be used individually or in combination. Although specific values are used in the above descriptions to facilitate the understanding of the present invention, the values are just examples and different values may also be used unless otherwise mentioned.

The present invention is not limited to the specifically disclosed embodiments, and variations and modifications may be made without departing from the scope of the present invention. Although functional block diagrams are used to describe apparatuses in the above embodiments, the apparatuses may be implemented by hardware, software, or a combination of them.

The present international application claims priority from Japanese Patent Application No. 2007-073728 filed on Mar. 20, 2007, the entire contents of which are hereby incorporated herein by reference.

The invention claimed is:

1. A mobile station transmitting an uplink signal according to a single-carrier scheme, comprising:
a selecting unit adapted for a system,
wherein multiple frequency bandwidths of different sizes are defined, each of the frequency bandwidths being expressed by a multiple of a minimum frequency bandwidth,
wherein a set of signal sequences is defined for each of the frequency bandwidths,
wherein multiple sequence groups are defined such that each of the sequence groups includes signal sequences selected from every one of multiple sets of the signal sequences defined for the frequency bandwidths and the signal sequences in each of the sequence groups are different from each other, and
wherein the selecting unit being configured to select a sequence group from the sequence groups;
a determining unit configured to determine a signal sequence that is included in the selected sequence group and corresponds to one of the frequency bandwidths;
a generating unit configured to generate a reference signal based on the determined signal sequence; and
a transmitting unit configured to transmit the reference signal generated by the generating unit.

2. The mobile station as claimed in claim 1, wherein the selecting unit is configured to select the one of the sequence groups based on a report from a base station.

3. The mobile station as claimed in claim 1, wherein the selecting unit is configured to select the one of the sequence groups based on a cell ID.

4. The mobile station as claimed in claim 1, wherein the reference signal generated by the generating unit is changed at a predetermined timing.

5. The mobile station as claimed in claim 2, wherein the reference signal generated by the generating unit is changed at a predetermined timing.

6. The mobile station as claimed in claim 3, wherein the reference signal generated by the generating unit is changed at a predetermined timing.

7. A method of transmitting an uplink signal according to a single-carrier scheme in a system, the method comprising:
selecting a sequence group from multiple sequence groups, wherein
multiple frequency bandwidths of different sizes are defined, each of the frequency bandwidths being expressed by a multiple of a minimum frequency bandwidth,
a set of signal sequences is defined for each of the frequency bandwidths, and
the sequence groups are defined such that each of the sequence groups includes signal sequences selected from every one of multiple sets of the signal sequences defined for the frequency bandwidths and the signal sequences in each of the sequence groups are different from each other;
determining a signal sequence that is included in the selected sequence group and corresponds to one of the frequency bandwidths;
generating a reference signal based on the determined signal sequence; and
transmitting the generated reference signal.

8. A radio communication system, comprising:
a mobile station transmitting an uplink signal according to a single-carrier scheme; and
a base station communicating with the mobile station,
wherein the mobile station includes:
a selecting unit adapted for a system,
wherein multiple frequency bandwidths of different sizes are defined, each of the frequency bandwidths being expressed by a multiple of a minimum frequency bandwidth,
wherein a set of signal sequences is defined for each of the frequency bandwidths,
wherein multiple sequence groups are defined such that each of the sequence groups includes signal sequences selected from every one of multiple sets of the signal sequences defined for the frequency bandwidths and the signal sequences in each of the sequence groups are different from each other, and
wherein the selecting unit being configured to select a sequence group from the sequence groups;
a determining unit configured to determine a signal sequence that is included in the selected sequence group and corresponds to one of the frequency bandwidths;
a generating unit configured to generate a reference signal based on the determined signal sequence; and
a transmitting unit configured to transmit the reference signal generated by the generating unit.

9. A base station communicating with a mobile station transmitting an uplink signal according to a single-carrier scheme, the base station comprising:
a receiving unit adapted for a system where
multiple frequency bandwidths of different sizes are defined, each of the frequency bandwidths being expressed by a multiple of a minimum frequency bandwidth,
a set of signal sequences is defined for each of the frequency bandwidths, and
multiple sequence groups are defined such that each of the sequence groups includes signal sequences selected from every one of multiple sets of the signal sequences defined for the frequency bandwidths and the signal sequences in each of the sequence groups are different from each other,
the receiving unit being configured to receive a reference signal generated based on signal sequences corresponding to one of the frequency bandwidths; and a processing unit configured to process the reference signal received by the receiving unit.

10. The base station as claimed in claim 9, further comprising:
a transmitting unit configured to transmit, to the mobile station, a report based on which the mobile station selects the one of the sequence groups.

11. The base station as claimed in 9, wherein the one of the sequence groups is selected based on a cell ID.

12. The base station as claimed in claim 9, wherein the reference signal received by the receiving unit is changed at a predetermined timing.

13. A method of communicating with a mobile station transmitting an uplink signal according to a single-carrier scheme in a system
the method comprising:
receiving a reference signal generated based on multiple signal sequences corresponding to one of multiple frequency bandwidths, wherein
the multiple frequency bandwidths of different sizes are defined, each of the frequency bandwidths being expressed by a multiple of a minimum frequency bandwidth,
a set of signal sequences is defined for each of different the frequency bandwidths, and
the sequence groups are defined such that each of the sequence groups includes signal sequences selected from every one of multiple sets of the signal sequences defined for the frequency bandwidths and the signal sequences in each of the sequence groups are different from each other; and
processing the received reference signal.

* * * * *